(12) United States Patent
Menkhoff

(10) Patent No.: US 8,819,100 B2
(45) Date of Patent: Aug. 26, 2014

(54) COEFFICIENT BOOST MULTIPLY ACCUMULATE UNIT

(75) Inventor: Andreas Menkhoff, Oberhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 404 days.

(21) Appl. No.: 12/978,826

(22) Filed: Dec. 27, 2010

(65) Prior Publication Data
US 2012/0166504 A1  Jun. 28, 2012

(51) Int. Cl.
*G06F 7/48* (2006.01)

(52) U.S. Cl.
USPC .......................................................... 708/523

(58) Field of Classification Search
None
See application file for complete search history.

(56) References Cited

U.S. PATENT DOCUMENTS

| | | | | |
|---|---|---|---|---|
| 5,517,436 A * | 5/1996 | Andreas et al. | | 708/524 |
| 5,659,495 A * | 8/1997 | Briggs et al. | | 708/523 |
| 6,275,838 B1 * | 8/2001 | Blomgren et al. | | 708/501 |
| 6,526,430 B1 * | 2/2003 | Hung et al. | | 708/523 |
| 6,904,446 B2 * | 6/2005 | Dibrino | | 708/501 |
| 7,467,175 B2 * | 12/2008 | Simkins et al. | | 708/523 |
| 7,472,155 B2 * | 12/2008 | Simkins et al. | | 708/523 |
| 7,668,892 B2 * | 2/2010 | Lutz et al. | | 708/205 |
| 8,112,466 B2 * | 2/2012 | Minz et al. | | 708/230 |
| 2003/0041082 A1 * | 2/2003 | Dibrino | | 708/501 |

OTHER PUBLICATIONS http://www.en.wikipedia.org/wiki/ARM_architecture, Dec. 27, 2010, p. 1-26.

\* cited by examiner

*Primary Examiner* — David H Malzahn

(74) *Attorney, Agent, or Firm* — Eschweiler & Associates, LLC

(57) ABSTRACT

In order to reduce the area and power consumption of MAC units, some aspects of the present disclosure relate to MAC units having a feedback path with an arithmetic element disposed thereon. The arithmetic element is often controlled so as to limit the number of bits needed in the data path, thereby limiting power and area required for the MAC unit.

16 Claims, 5 Drawing Sheets

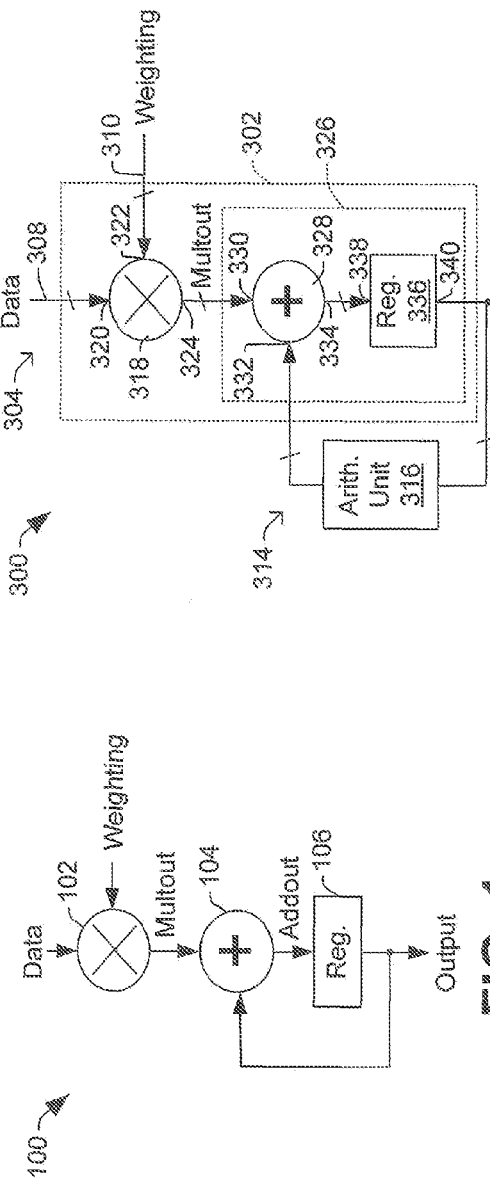
FIG. 1 (PRIOR ART)
FIG. 3
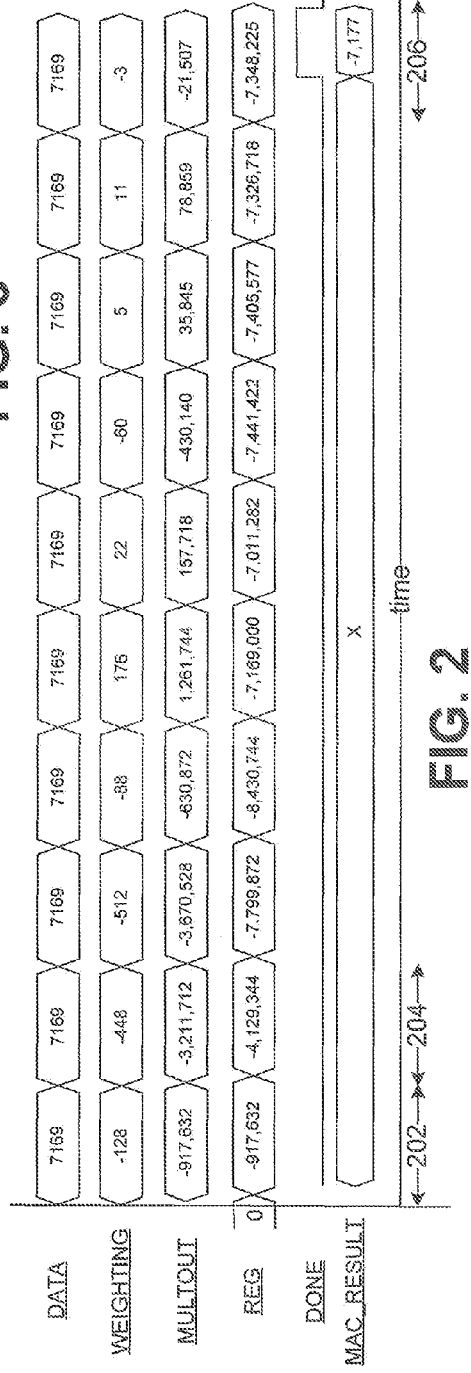
FIG. 2

COEFFICIENT BOOST MULTIPLY ACCUMULATE UNIT

BACKGROUND

In computing, especially digital signal processing, multiply-accumulate operations are commonly used to accumulate a number of products in successive fashion. A conventional multiply-accumulate unit 100 (MAC unit) includes a multiplier 102, an adder 104, and an accumulator register 106 coupled as shown in FIG. 1. The output of the accumulation register 106 is fed back to one input of the adder 104, so that on each clock the output of the multiplier 102 is added to an accumulated total stored in the register 106.

FIG. 2 shows an example of a conventional MAC operation as a series of waveforms 200, and is discussed in the context of MAC unit 100 of FIG. 1. In this example, which extends over ten accumulate cycles, the multiplier 102 delivers a product for each cycle by multiplying an input data value by a weighting factor. The products are then successively accumulated by adder 104 and accumulation register 106.

More specifically, for a first cycle 202, the multiplier 102 multiplies a data value of 7,169 with a weighting factor of −128, thus outputting a product of −917,632 for the first cycle 202. The adder 104 adds this product of −917,632 to the current value (i.e., 0) in the accumulation register 106, and thus outputs a sum of −917,632. At the end of the first cycle 202, the accumulate register 106 has latched an accumulated total of −917,632. During a second cycle 204, the multiplier 102 multiplies an input data value of 7,169 with a new weighting value of −448, and outputs a product of −3,211,712 during the second cycle. The adder 104 adds −3,211,712 to the accumulated total of −917,632 stored in register 106, such that the accumulate register 106 has latched a value of −4,129,344 at the end of the second cycle 204. Multiplying and accumulation continues in this manner until the products have been accumulated over all cycles, here resulting in a total of −7,348,225 by the tenth cycle 206. Because the input data was a signed 14-bit binary number, it is often desirable to deliver a 14-bit binary number as a MAC result at the output. Hence, the 10 least significant bits (LSBs) of the output are truncated in this example, thereby giving a final MAC result of −7,177 at the end of processing at 206.

Because the MAC unit 100 is implemented in binary logic, the MAC unit 100 for this example requires, at minimum, a 14-bit by 10-bit multiplier, a 25-bit adder, and a 25 bit accumulation register. Thus, although the conventional MAC unit 100 can compute a MAC operation quickly, it requires a large amount of combinatorial logic due to, for example, the multiplier. This large amount of combinatorial logic requires a correspondingly large area, and consumes a correspondingly large amount of power.

As today's consumers expect smaller and cheaper electronic devices that can operate for longer periods on a single battery charge, this disclosure provides improved MAC units that tend to require less area and consume less power than conventional MAC units.

DESCRIPTION OF THE DRAWINGS

FIG. 1 is a block diagram of a conventional MAC unit.

FIG. 2 is an example timing diagram consistent with FIG. 1's MAC unit.

FIG. 3 is a block diagram in accordance with some embodiments.

DETAILED DESCRIPTION

Figures 4, 5:
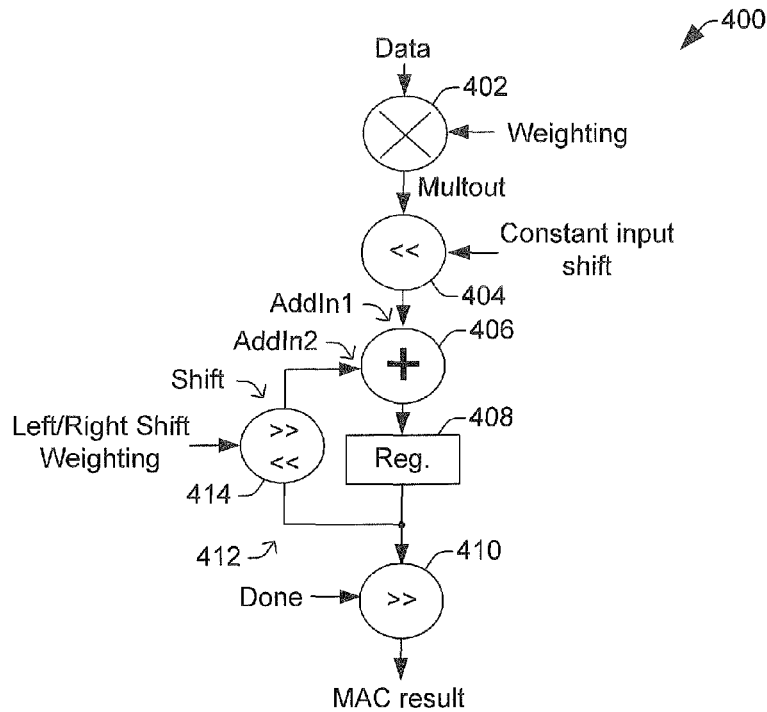
FIG. 4 is a block diagram of a MAC unit in accordance with some embodiments.
FIG. 5 is an example timing diagram consistent with FIG. 4's MAC unit.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

In order to reduce the area and power consumption of MAC units, some aspects of the present disclosure relate to MAC units having a feedback path with an arithmetic element disposed thereon. The arithmetic element is often controlled so as to limit the number of bits needed in the data path, thereby limiting power and area required for the MAC unit.

FIG. 3 discloses a MAC unit 300 in accordance with some embodiments. The MAC unit 300 includes a data path 302 extending from an input region 304 to an output region 306. First and second input vectors (e.g., in the form of a sequence of data elements and weighting elements) are received on first and second input terminals 308, 310, respectively, associated with the input region 304. An output vector is provided on an output terminal 312 associated with the output region 306. A feedback path 314 is coupled from a first point near the output region 306 to a second point on the data path 302, where the feedback path 314 includes an arithmetic element 316 disposed thereon.

The illustrated data path 302 includes a multiplier 318 having a first multiplier input terminal 320 to receive the first input vector, a second multiplier input terminal 322 to receive the second input vector, and a multiplier output terminal 324 to provide the output vector. The output vector is a product of the first and second input vectors. An accumulate unit 326 is downstream of the multiplier 318, and includes an adder 328 having a first adder input terminal 330 coupled to the multiplier output terminal 324, a second adder input terminal 332 coupled to the feedback path 314, and an adder output terminal 334. An accumulation register 336 downstream of the adder 328 has an input 338 coupled to the adder output terminal 334, and has an output 340 coupled to the feedback path 314.

Figure 10:
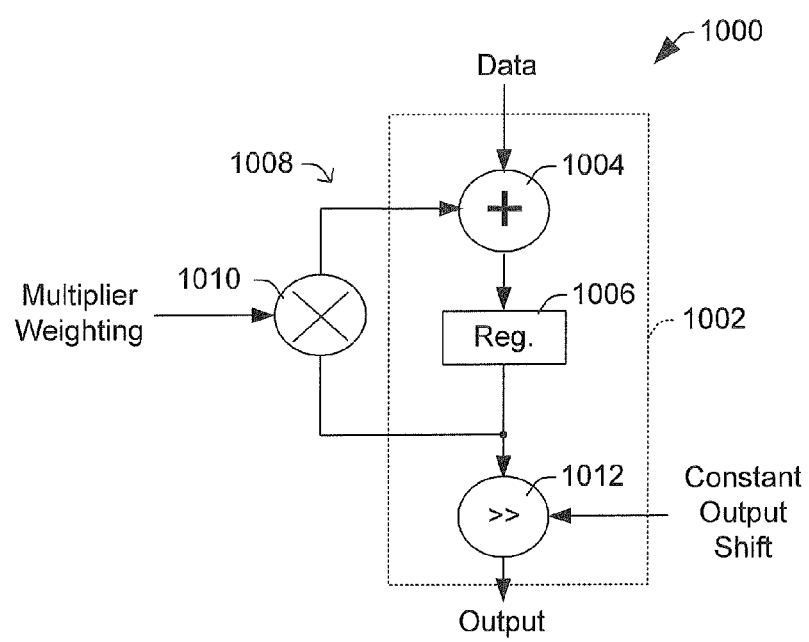
FIG. 10 is a block diagram of a MAC unit in accordance with some embodiments.

In some embodiments, the arithmetic element 316 comprises a bit-shift element (e.g., a unidirectional left shift element, a unidirectional right shift element, or a bi-directional (left and right) shift element), but the arithmetic element 316 can also comprise a multiplier, divider, or other type of arithmetic element. For example, FIGS. 4, 6, and 8, which are described below, show some examples where an arithmetic element is a bit-shift element; while FIG. 10 shows another example where an arithmetic element is a multiplier unit. For purposes of contrast and comparison, example timing diagrams in FIGS. 5, 7, and 9 (consistent with examples carried out on the MAC units of FIGS. 4, 6, and 8, respectively) all show a MAC operation for input vectors having the same input elements as previously described in FIG. 2.

Turning now to FIG. 4, one can see an example wherein a MAC unit 400 comprises a data path that includes a multiplier 402, a first bit-shift element 404, an adder 406, an accumulation register 408, and a second bit-shift element 410 coupled as shown. A feedback path 412, which couples the output of the accumulation register 408 to a second input terminal of the adder 406, includes a third bit-shift element 414 thereon.

In this example, it is expected that the ten LSBs are to be discarded at the end of the MAC operation, so the weighting elements are divided by $2^{10}$ (i.e., 1024 in decimal), relative to FIG. 1's implementation. Thus, the weighting vector in the example of FIGS. 4-5 are as follows:

$$\text{Weighting}/1024=\{-(1/8),-(7/16),-(1/2),-(11/128),11/64,11/512,-(15/256),5/1024,11/1024,-(3/1024)\}.$$

The numerators of the weighting elements of this vector are supplied to the second input terminal of the multiplier 402. The differences of the denominator of the weighting elements of this vector will be used for the shift weighting by the third bit shifter 414.

As shown in FIG. 5, the first shifter 404 shifts the output of the multiplier 402 by a fixed number of bits (here 3 bits to the right) so the adder 406 can accumulate successive products from the multiplier 402. Thus the MAC unit 400 calculate the following 10 cycles:

First Cycle (502): $(0+((-1*7169)<<3))<<1=-114,704$

Second Cycle (504): $(-114704+((-7*7169)<<3))>>3=-64,521$

Third Cycle (506): $(-64521+((-1*7169)<<3))<<6=-7,799,872$

Fourth Cycle (508): $(-7799872+((-11*7169)<<3))>>1=-4,215,372$

Fifth Cycle (510): $(-4215372+((11*7169)<<3))<<3=-28,676,000$

Sixth Cycle (512): $(-28676000+((11*7169)<<3))>>1=-14,022,564$

Seventh Cycle (514): $(-14022564+((-15*7169)<<3))<<2=-59,531,376$

Eighth Cycle (516): $(-59531376+((5*7169)<<3))<<0=-59,244,616$

Ninth Cycle (518): $(-59244616+((11*7169)<<3))<<0=-58,613,744$

Tenth Cycle (520): $(-58613744+((-3*7169)<<3))>>3=-7,348,225$

To accurately represent the accumulated total, a signed 27 bit adder 406 and register 408 are required for the accumulate unit in the MAC unit 400. If the MAC result requires the same number of bits as the input data, the second shifter 410 can be used to discard the 10 LSBs and get the float output value −7176.000976, which has the integer floor value −7177. The MAC output value is a 14-bit signed binary number.

Compared to the MAC unit 100 of FIG. 1 and notwithstanding the first bit-shift element 404, the MAC unit 400 in FIG. 4 is slightly smaller than the MAC unit 100. This is because the multiplier 402 needs to be only a 14 bit by 5 bit multiplier, which is approximately half the size as the multiplier 102 in FIG. 1's MAC unit 100. Even though FIG. 4's adder 406 and accumulate register 408 are slightly larger than that of FIG. 1 (27 bit adder and register in FIG. 4 vs. 24 bit adder and register in FIG. 1), the reduction in multiplier size leads to the MAC unit 400 tending to be slightly smaller than conventional MAC unit 100, such that the MAC unit 400 tends to have a smaller footprint and consume less power.

Figure 6:
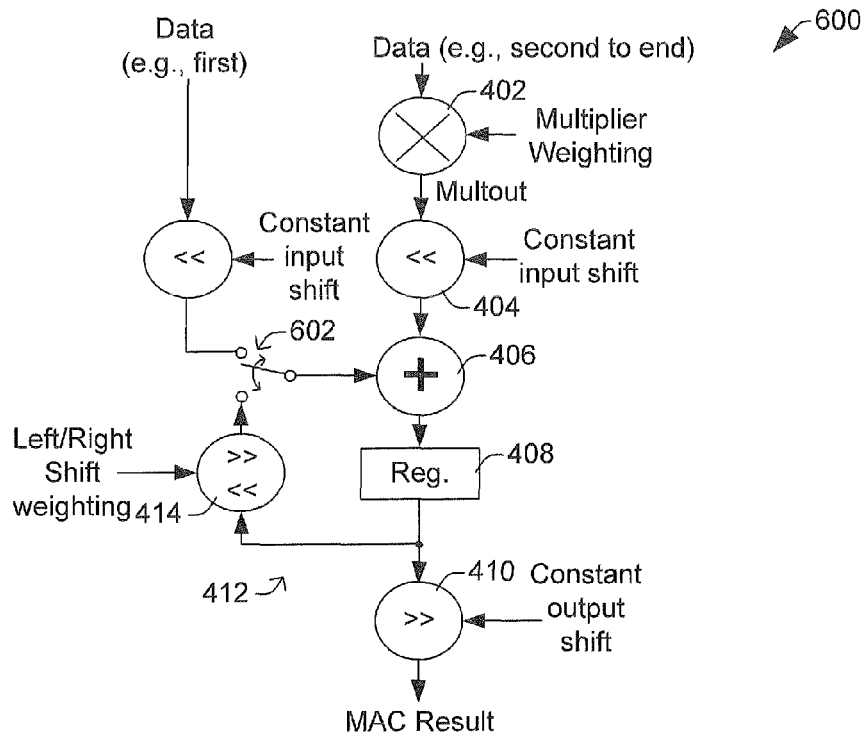
FIG. 6 is a block diagram of a MAC unit in accordance with some embodiments.
Figure 7:
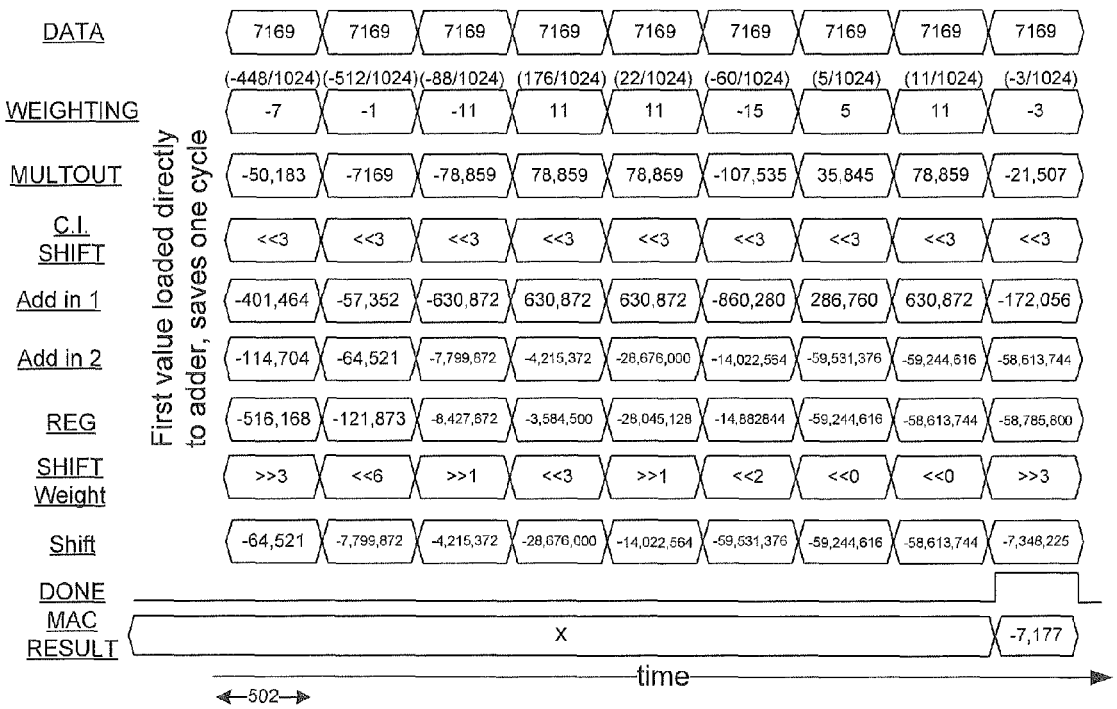
FIG. 7 is an example timing diagram consistent with FIG. 6's MAC unit.

FIG. 6 shows another example of a MAC unit 600 in accordance with some aspects of the present disclosure. This MAC unit 600 is similar to the MAC unit of FIG. 4, except that MAC unit 600 includes a switch 602 coupled on the feedback path 412. During operation, the switch 602 provides the first data element of a MAC operation sequence directly to the second input of the adder 406, and then for subsequent data elements of the MAC operation sequence the switch couples the third shifter 414 to the second input of the adder 406. This configuration saves one cycle relative to FIG. 4's implementation, because the first and second data elements can be immediately added together during the first cycle 702 in FIG. 6-7, whereas in FIGS. 4-5 the first cycle 502 consisted of only loading the first data element into the accumulation register 408.

Figures 8, 9:
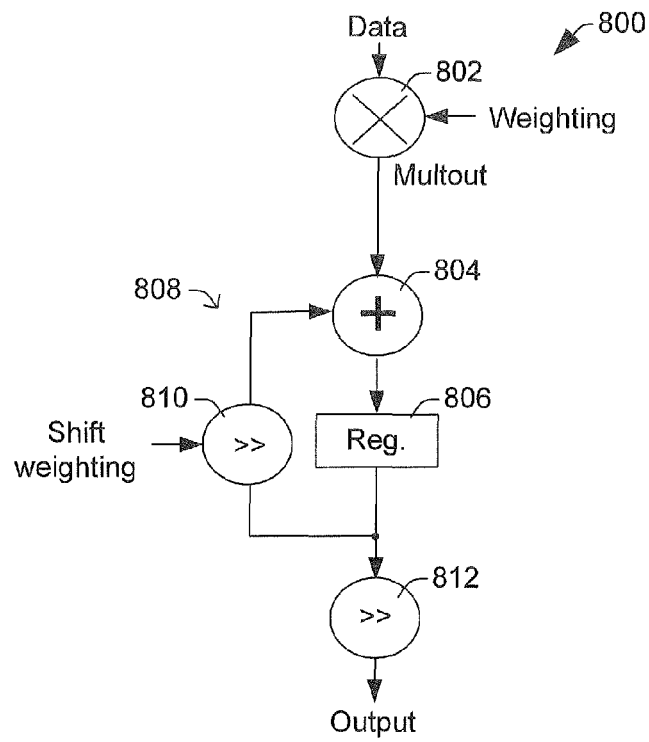
FIG. 8 is a block diagram of a MAC unit in accordance with some embodiments.
FIG. 9 is an example timing diagram consistent with FIG. 8's MAC unit.

FIG. 8 shows another example of a MAC unit 800 in accordance with some embodiments. This MAC unit 800 includes fewer components than previous embodiments, and as will be appreciated in more detail below, "squeezes" out bits gradually during the MAC operation, such that significantly less logic is used for the MAC unit 800 relative to previously discussed MAC units. The MAC unit 800 includes a multiplier 802, adder 804, accumulation register 806, and a feedback path 808 that includes a first bit shift element 810 thereon. A second bit-shift element 812 can also be included.

For the weighting vector in the example of FIGS. 8-9, it is again considered that 10 LSBs at the output will be thrown away. Thus, the weighing elements are again divided by $2^{10}=1024$:

$$Wgt/1024=\{-(1/8),-(7/16),-(1/2),-(11/128),11/64,11/512,-(15/256),5/1024,11/1024,-(3/1024)\}.$$

The numerators of the elements of this vector will be used for the multiplier weighting. The differences of the denominator of the weighting elements of this vector will be used for the shift weighting. For efficient calculation, the example of FIG. 9 arranges the sequence of MAC operations so the weighting elements with a large denominator are calculated first and the weighting elements the smallest denominator are calculated last. Thus the MAC unit 800 calculates the following 10 steps:

First Cycle (902): $0+((-3*7169)>>0)=-21507$

Second Cycle (904): $-21507+((11*7169)>>0)=57352$

Third Cycle (906): $57352+((5*7169)>>1)=46598$

Fourth Cycle (908): $46598+((11*7169)>>1)=62728$

Fifth Cycle (910): $62728+((-15*7169)>>1)=-22404$

Sixth Cycle (912): $-25000+((-11*7169)>>1)=-50632$

Seventh Cycle (914): $-50632+((11*7169)>>2)=7056$

Eighth Cycle (916): $7056+((-7*7169)>>1)=-21564$

Ninth Cycle (918): $-21564+((-1*7169)>>2)=-7184$

Tenth Cycle (920): $-7184+((-1*7169)>>1)=-7177$

Again, the output value of the MAC unit 800 is the same as the previous examples. However, the MAC unit 800 needs only a 14 bit*5 bit multiplier which is half as big as the conventional MAC unit 100. Further, the MAC unit 800 needs only an internal 18-bit adder and 18-bit register, which is smaller than the 24-bit adder and 24-bit register for the conventional MAC unit 100. Thus, the MAC unit 800 can provide considerable area and power savings relative to conventional MAC units.

It will be appreciated that the numerical example discussed with respect to FIGS. 2, 4, 6, and 8 in no way limits the present disclosure. To emphasize this point, another example is now discussed. In particular, this example calculates the value of $5040*\sin(27,449/65,536)$, and compares how the calculation is carried out for a conventional MAC unit (e.g., FIG. 1 MAC unit 100) versus a MAC unit 1000 of FIG. 10.

Because these MAC units have no way of directly looking up the numerical value of $\sin(27,449/65,536)$, a MAC unit makes use of the fact that the function sin(x) can be approximated by the following power series:

$$\sin(x) = x - x^3/3! + x^5/5! - x^7/7! + x^9/9!$$

Hence, in our example a MAC unit calculates the value of:

$$5040 * \sin(x) = 5040 * (x - x^3/6 + x^5/120 - x^7/5040)$$
$$= 5040 * x - 840 * x^3 + 42 * x^5 - x^7,$$

where x=27,449/65,536 in our example.

Hence, a conventional MAC unit (e.g., MAC unit 100 of FIG. 1) could carry out a MAC operation by using a 14 bit weighting vector={5040, −840, 42, −1} and a 16 bit data vector={27,449, 4815, 845, and 148} in four cycles as follows:

1) 0+5040*27,449=138,342,960
2) 138,342,960−840*4815=134,298,360
3) 134,298,360+42*845=134,333,850
4) 134,333,850−1*148=134,444,702

For the output, the MAC unit 100 discards the 16 LSBs, such that the MAC unit 100 outputs a value of 2049. Thus, the MAC unit has determined 5040*sin(27,449/65,536)=2049—a correct result. However, as previously discussed, although this calculation is effective, this MAC unit 100 consumes a significant amount of area (and hence power) during operation, due in part to the 14-bit by 16-bit multiplier required for the calculation.

FIG. 10 shows another embodiment of a MAC unit 1000 that may reduce area (and consequently power) in calculating 5040*sin(27,449/65,536). The MAC unit 1000 includes a data path 1002 that includes an adder 1004 and a accumulation register 1006 downstream of the adder 1004. A feedback back, which includes a multiplier 1010, couples the output of the accumulation register 1006 back to a second input terminal of the adder 1004. With the same input samples we calculate:

$$(0+27,449)*6=164,694$$

$$(164,694-4,815)*20=3,197,580$$

$$(3,197,580+845)*42=134,333,850$$

$$(134,333,850-148)*1=134,333,702$$

This is exact the same result as the calculations have been done with circuit of FIG. 1 discussed above. The constant output shift block 1012 discards 16 LSBs, such that the MAC unit outputs of value of 2049 as the solution to 5040*sin(27,449/65,536). However, the MAC unit 1000 needs a 23-bit by 7-bit multiplier, rather than the 14-bit by 16-bit multiplier previously required for FIG. 1's calculation.

If the MAC unit 1000 calculates performs the same calculation with 6 cycles, the weighting elements can be further reduced. With the same input samples, the MAC unit 100 calculates the following 6 steps:

1) (0+27,449)*6=164,694
2) (164,694−4,815)*4=639,516
3) (639,516+0)*5=3,197,580
4) (3,197,580+845)*6=19,190,550
5) (19,190,550+0)*7=134,333,850
6) (134,333,850−148)*1=134,333,702

Thus, the size of the multiplier can be further reduce to 4-bits by 23-bits.

Although the disclosure has been shown and described with respect to one or more implementations, equivalent alterations and modifications will occur to others skilled in the art based upon a reading and understanding of this specification and the annexed drawings. For example, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A multiply accumulate (MAC) unit, comprising:
an adder having first and second adder inputs and an adder output;
an accumulation register configured to store a value equal to a sum of a current input to the adder and a preceding output of the adder previously stored in the accumulation register, wherein the accumulation register comprises an output and an input coupled to the adder output;
a bit-shift element having an input coupled to the output of the accumulation register;
a feedback path that includes an arithmetic element disposed thereon, wherein the feedback path has a first end, which branches off a path connecting the output of the accumulation register and the input of the bit-shift element, and has a second end, which is coupled to the second adder input; and
a switch disposed between the arithmetic element and the second adder input, wherein the switch has a first input terminal coupled to the arithmetic element, a second input terminal coupled to another data path, and an output terminal coupled to the second adder input,
wherein the switch selectively couples the arithmetic element and the another data path to the second adder input.

2. The MAC unit of claim 1, further comprising:
a multiplier comprising: a first multiplier input to receive a first input vector, a second multiplier input to receive a second input vector, and a multiplier output to provide an output vector to the first adder input, wherein the output vector is a product of the first and second input vectors.

3. The MAC unit of claim 2, wherein the arithmetic element on the feedback path operates on an output value from the accumulation register and provides an arithmetically operated on value to the second adder input.

4. The MAC unit of claim 1, wherein the arithmetic element is a bit shift element to bit-shift a multi-bit value.

5. The MAC unit of claim 4, wherein the bit shift element is configured to uni-directionally bit shift the multi-bit value.

6. The MAC unit of claim 1, wherein the arithmetic element is a multiplier.

7. The MAC unit of claim 1, wherein the arithmetic element is a divider.

8. The MAC unit of claim 1, wherein the first end of the feedback path is coupled to a branch point located directly at the output of the accumulation register.

9. A multiply accumulate (MAC) unit, comprising:
an adder having first and second adder inputs and an adder output;
an accumulation register configured to store a value equal to a sum of a current input to the adder and a preceding output of the adder previously stored in the accumulation register, wherein the accumulation register comprises an output and an input coupled to the adder output;
a bit-shift element having an input coupled to the output of the accumulation register; and
a feedback path that includes an arithmetic element disposed thereon, wherein the feedback path has a first end, which branches off a path connecting the output of the accumulation register and the input of the bit-shift element, and has a second end, which is coupled to the second adder input,
wherein the arithmetic element is a bit shift element to bit-shift a multi-bit value, and
wherein the arithmetic element is a bit shift element configured to bi-directionally shift the multi-bit output value.

10. A multiply accumulate (MAC) unit, comprising:
an accumulate unit comprising: an adder having a first adder input terminal and an adder output terminal, and an accumulation register having an input coupled to the adder output terminal, wherein the accumulation register is configured to store a value equal to a sum of a current input to the adder and a preceding output of the adder previously stored in the accumulation register; and
an arithmetic element disposed on a feedback path coupling an output of the accumulation register to a second adder input terminal of the adder, wherein the feedback path has a first end coupled to a branch point located directly at the output of the accumulation register and has a second end coupled to the second adder input terminal,
wherein the arithmetic element is a bit shift element to bit-shift a multi-bit output value provided by the accumulation unit, and
wherein the bit shift element is configured to bi-directionally bit shift the multi-bit output value provided the accumulation unit.

11. The MAC unit of claim 10, wherein the arithmetic element is a multiplier.

12. The MAC unit of claim 10, wherein the arithmetic element is a divider.

13. The MAC unit of claim 12, further comprising:
a bit-shift element downstream of the accumulate unit.

14. The MAC unit of claim 10, further comprising:
a multiplier comprising: first and second multiplier input terminals and a multiplier output terminal, wherein the multiplier output terminal is coupled to the first adder input terminal.

15. The MAC unit of claim 14, further comprising:
a bit-shift element operably coupled between the multiplier and the accumulate unit.

16. A multiply accumulate (MAC) unit, comprising:
an accumulate unit comprising: an adder having a first adder input terminal and an adder output terminal, and an accumulation register having an input coupled to the adder output terminal, wherein the accumulation register is configured to store a value equal to a sum of a current input to the adder and a preceding output of the adder previously stored in the accumulation register;
an arithmetic element disposed on a feedback path coupling an output of the accumulation register to a second adder input terminal of the adder, wherein the feedback path has a first end coupled to a branch point located directly at the output of the accumulation register and has a second end coupled to the second adder input terminal;
a multiplier comprising first and second multiplier input terminals and a multiplier output terminal, wherein the multiplier output terminal is coupled to the first adder input terminal; and
a switch disposed between the arithmetic element and the second adder input, wherein the switch has a first input terminal coupled the arithmetic element, a second input terminal coupled to another data path, and an output terminal coupled to the second adder input terminal;
wherein the switch selectively couples the arithmetic element and the another data path to the second adder input terminal.

* * * * *